United States Patent [19]

Yamashita

[11] 4,305,757
[45] Dec. 15, 1981

[54] ANTIBLURRING GLASS

[75] Inventor: Toshiharu Yamashita, Hachioji, Japan

[73] Assignee: Hoya Corporation, Tokyo, Japan

[21] Appl. No.: 166,289

[22] Filed: Jul. 7, 1980

Related U.S. Application Data

[63] Continuation of Ser. No. 46,963, Jun. 8, 1979, abandoned, which is a continuation of Ser. No. 851,915, Nov. 16, 1977, abandoned, and Ser. No. 858,976, Dec. 9, 1977, abandoned.

[30] Foreign Application Priority Data

Dec. 9, 1976 [JP] Japan ................................. 51/148161

[51] Int. Cl.$^3$ ............................................... C03C 3/16
[52] U.S. Cl. ............................... 501/78; 252/301.4 P; 501/79; 501/905
[58] Field of Search ................... 106/47 Q, 54, 52, 53; 252/301.4 P

[56] References Cited

U.S. PATENT DOCUMENTS

| 3,846,142 | 11/1974 | Buzhinsky et al. | 106/47 Q |
| 3,926,649 | 12/1975 | Ray et al. | 106/54 X |
| 3,935,018 | 1/1976 | Ray et al. | 106/47 Q |
| 3,979,322 | 9/1976 | Alexeev et al. | 106/47 Q |
| 3,989,532 | 11/1976 | Ray et al. | 106/47 Q |
| 4,022,707 | 5/1977 | Deutschbein et al. | 106/47 Q |
| 4,026,714 | 5/1977 | Lewis | 106/54 X |
| 4,248,732 | 2/1981 | Myers et al. | 106/54 X |

Primary Examiner—Helen M. McCarthy

[57] ABSTRACT

A glass for use as an optical glass having an anti-blurring property, water resistance and hardness and decreased liquidus temperature, said glass consisting essentially of, in mol. %, 47 to 65% $P_2O_5$, 0.5 to 12% $SiO_2$, 0.5 to 10% $B_2O_3$, 6 to 15% $SiO_2+B_2O_3$, 0 to 30% alkali metal oxide, 5 to 35% alkaline earth metal oxide, 20 to 45% alkali metal oxide+alkaline earth metal oxide, 0 to 5% $Al_2O_3$, 0 to 10% ZnO, and no PbO. Oxides of Ce, Nd and Er may also be present.

3 Claims, 2 Drawing Figures

ANTIBLURRING GLASS

This application is a continuation of Application Ser. No. 046,963, filed June 8, 1979, now abandoned, which in turn is a continuing combined application of Ser. No. 851,915, filed Nov. 16, 1977, and of Ser. No. 858,976 filed Dec. 9, 1977, both of which are now abandoned.

BACKGROUND OF THE INVENTION

1. Field of the Invention

This invention relates to a glass having water resistance and hardness satisfactory for practical purposes and superior antiblurring properties.

This invention also relates to the above type of glass for eyeglasses, which has a refractive index (nd) of 1.50 to 1.55, contains $CeO_2$ which absorbs ultraviolet light injurious to the eyes and $Nd_2O_3$ or $Er_2O_3$ which has an antiglare effect;

2. Description of the Prior Art

Generally, when the surface temperature of a glass falls below the dew point of moist air, small water droplets condense on the glass and the glass becomes blurred. This phenomenon depends upon the difference between the dew point of the air and the surface temperature of the glass and the relative humidity of the atmospheric air, and larger temperature differences cause greater blurring. If the relative humidity is extremely low, water droplets are not easily formed, and therefore, the glass does not blur easily. If the relative humidity is high, the water droplets tend to be large, and the glass also tends not to blur. However, the images viewed by transmission or reflection become indistinct.

The current practice for preventing glass from blurring is only to prevent or remove blurring temporarily by heating the glass or coating the glass with a surface active agent which has poor durability and must be repeatedly coated. For preventing blurring, the most ideal situation is for glass itself to have an antiblurring property. The present invention pertains to such a glass.

Japanese Patent Application (OPI) No. 46713/75 discloses a prior art antiblurring glass which is a phosphate glass having a transition temperature of not more than 300° C., and is characterized in that in the glass composition shown in a working example, the amount of $B_2O_3$ is not more than 3.1 mole %, and large amounts of lead oxide and/or alkali metal oxides are present in the glass.

However, a glass having such a characteristic composition has poor water resistance, and is attacked by moisture in the air at high temperature and high humidities. This results in the formation of a tacky layer composed mainly of a phosphoric acid ingredient. Since this layer is strongly acidic, the formation of the layer is very dangerous. Furthermore, since the hardness of such a glass is excessively low, the glass surface is susceptible to damage. For applications requiring a high degree of planar precision such as eyeglass lenses, such a glass is not suitable because high planar precision cannot be obtained by polishing.

Japanese Patent Application (OPI) No. 47407/74 discloses an inorganic oxide glass and Japanese Patent Application (OPI) No. 38522/77 discloses an inorganic oxide glass composition.

SUMMARY OF THE INVENTION

The present invention is based on a discovery that has successfully remedied the defects of the glass of Japanese Patent Application (OPI No. 46713/75 without reducing its antiblurring property.

Introduction or increase of $SiO_2$, $B_2O_3$ and $Al_2O_3$ in glasses of this kind is very effective for increasing the water resistance and hardness of the glasses. From this viewpoint alone, it would be desirable for the amounts of these components to be as large as possible. However, introduction of excessively large amounts of these ingredients causes an increase in the liquidus temperature. This problem can be solved by the introduction of $SiO_2$ and the copresence of $SiO_2$ and $B_2O_3$. Since $SiO_2$, unlike $Al_2O_3$ or $B_2O_3$, does not form an $AlPO_4$ or $BPO_4$ tetrahedral structure while consuming the $P_2O_5$ component. The glass has properties inherent to phosphate glasses, and the antiblurring property of the glass can be retained. As shown in FIG. 1, the liquidus temperature of the glass is markedly lowered by the copresence of $SiO_2$ and $B_2O_3$, and the glass becomes stable. This is possible only when $SiO_2$ and $B_2O_3$ are copresent.

PbO reduces the water resistance and the hardness of the glass. In particular, PbO markedly decreases the hardness. It is also undesirable from the viewpoint of the antiblurring property of the glass because this component has a great effect of reducing the surface tension of glass, and decreases the ability of the glass to be wet by water. In this invention, therefore, PbO is not necessarily needed, but no undesirable effects arise if a small amount of PbO is employed.

Another object of this invention is to provide a glass for eyeglasses, which absorbs ultraviolet light injurious to the eyes, and has a favorable color for eyeglasses, antiglare properties, anti-blurring properties, and higher water resistance and hardness.

Introduction of $CeO_2$ causes these glasses to absorb ultraviolet light injurious to the eyes. Introduction of $Nd_2O_3$ or $Er_2O_3$ or a mixture thereof causes these glasses to have an antiglare effect.

According to the present invention, there is provided a base glass having an antiblurring property, the glass comprising, by mole %, 47 to 65% of $P_2O_5$, 0 to 12% of $SiO_2$, 0 to 10% of $B_2O_3$, with the total proportion of $SiO_2+B_2O_3$ being 6 to 15%, 0 to 30% of alkali metal oxide, most usually at least one of $Li_2O$, $Na_2O$, and $K_2O$ (hereinafter $R_2O$), 5 to 35% of alkaline earth metal oxide, most usually at least one of MgO, CaO, SrO, and BaO (hereinafter RO), with the total proportion of the $R_2O$+the RO being 20 to 45%, 0 to 5% of $Al_2O_3$, 0 to 10% of ZnO and 0 to 5% of PbO. To 100 parts of this base glass may be optionally added 0.1 to 2 parts by mole of $CeO_2$; and 0 to 1.5 parts by mole of $Nd_2O_3$ or 0 to 1 part by mole of $Er_2O_3$ or a mixture thereof.

Figure 2:
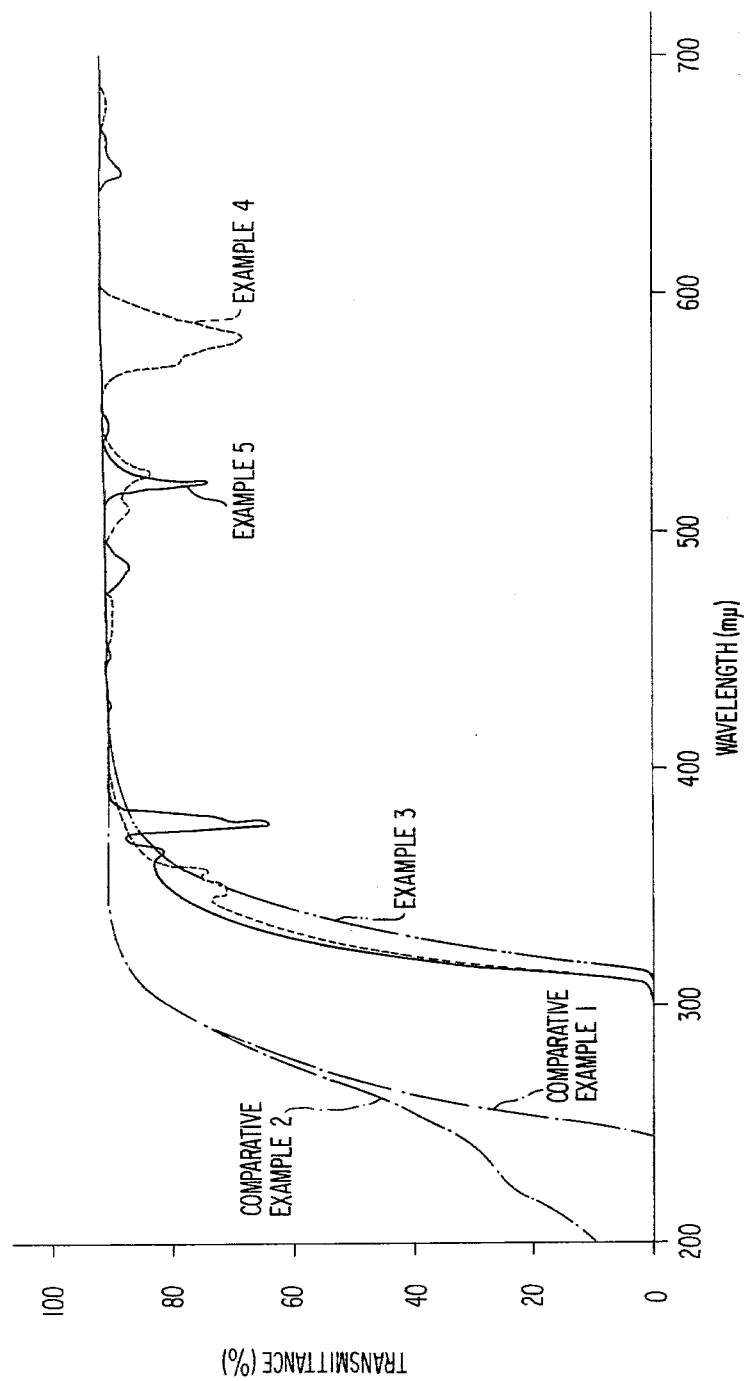

The FIG. 2 shows the spectral transmission curves of glasses of this invention and comparison glasses.

DETAILED DESCRIPTION OF THE INVENTION

The glass of this invention has good water resistance whereby it is not attacked by moisture in the air even at high temperatures and high humidities and thus is free from the formation of a tacky layer on the glass surface. The glass also has good hardness whereby a high planar precision can be obtained using an ordinary polishing method, and it is comparatively resistant to damage. The antiblurring property of the glass of this invention is superior not only to ordinary silicate glasses but also to the glass disclosed in Japanese Patent Application (OPI) No. 46713/75 with broad temperature and relative humidity ranges.

The reasons for the limitation of the contents of the individual glass components are given below. Herein all percentages are mole percents.

If the amount of $P_2O_5$ is outside the range of 47 to 65%, the resulting glass becomes susceptible to blurring. If the amount of $P_2O_5$ exceeds 65%, the liquidus temperature of the glass becomes high, and devitrification tends to occur.

The amounts of $SiO_2$ and $B_2O_3$ may be 0%, but from the viewpoint of the liquidus temperature of the glass, amounts of at least 0.5% are preferred. If the amount of $SiO_2$ exceeds 12% and the amount of $B_2O_3$ exceeds 10%, the liquidus temperature is high, and devitrification tends to occur. If the total amount of $SiO_2 + B_2O_3$ is less than 6%, glasses having high water resistance and hardness cannot be obtained. If, on the other hand, the total amount of these two components is more than 15%, devitrification tends to occur, and the antiblurring property is deteriorated. Preferably the amount of $SiO_2$ is 0.5 to 12 mole % and the amount of $B_2O_3$ is 0.5 to 10 mole %.

If the amount of one or more alkali metal oxides, $Li_2O$, $Na_2O$ and $K_2O$, exceeds 30%, or the amount of one or more alkaline earth metal oxides, MgO, CaO, SrO and BaO, is less than 5%, glasses with good water resistance cannot be obtained. If the content of the alkaline earth metal oxide is more than 35%, the glass tends to be blurred. In order to prevent an increase in the liquids temperature and a deterioration of the antiblurring property and hardness and to adjust the refractive index (nd) of the glass to 1.50 to 1.55, the proportions of the alkaline earth metal oxides should preferably be as follows: 25 mole % or less for MgO, 30 mole % or less for CaO, 25 mole % or less for SrO, and 14 mole % or less for BaO. When the total amount of the alkali metal oxides and alkaline earth metal oxides is 20 to 45%, glasses having relatively high water resistance and hardness and antiblurring property can be obtained.

$Al_2O_3$ is especially effective for increasing the water resistance of the glass, but since it renders the glass susceptible to blurring, the amount of $Al_2O_3$ should preferably be up to 5%.

ZnO and PbO should not be incorporated in great amounts because they are inferior to alkaline earth metal oxides in imparting water resistance to the glass, and moreover render the glass susceptible to blurring. In addition, PbO also markedly reduces the hardness of the glass. Thus, the amount of ZnO should be limited to 10% or less, and the amount of PbO, to 5% or less.

If $CeO_2$ is incorporated in the glass in an amount of less than 0.1 part by mole, the glass does not have a sufficient ability to absorb ultraviolet light which is injurious to the eyes, and if the amount of $CeO_2$ is more than 2 parts by mole, a devitrification of the glass tends to occur.

$Nd_2O_3$ and $Er_2O_3$ have the effect of preventing glare since they sharply absorb light in the vicinity of about 580 m$\mu$ or about 520 m$\mu$, respectively. Suitable amounts of $Nd_2O_3$ and $Er_2O_3$ are 0.1 to 1.5 parts by mole and 0.1 to 1.0 part by mole, respectively. A mixture of $Nd_2O_3$ and $Er_2O_3$ can be used, e.g., in an amount of 0.1 part by mole or higher. If the amounts of $Nd_2O_3$ and $Er_2O_3$ are less than 0.1 part by mole, the effects of these components are low, and if the amounts of $Nd_2O_3$ and $Er_2O_3$ exceeds the upper limits described above, the color density of the glass become too high to be suitable for ordinary eyeglasses.

Some examples of the glass of this invention are shown below together with their water resistance and hardness values measured by the following methods. The numerical figures showing the composition of the glass are in mole %.

WATER RESISTANCE (DW %)

A glass sample finished using #400 abrasive grains and having a size of 12×10×6 mm (weight Wo) was placed in a platinum cage. It was immersed for 60 minutes in 80 ml of distilled water heated at the boiling point. After drying and cooling, the weight (W) of the sample was measured. The weight loss was calculated in accordance with the following equation, and defined as the water resistance.

$$Dw\ (\%) = \frac{(W_o - W)}{W_o} \times 100$$

HARDNESS (HK, kg/mm$^2$)

The Knoop hardness was determined by loading a pyramid-shaped diamond indentor with vertex angles of 172°30′ and 130° on a polished glass surface at 0.1 kg for 15 seconds.

The Knoop hardness Hk was calculated by the following formula:

Hk (kg/mm$^2$) = 14.23 × P/l$^2$.

where P is the load (in kg) and l is the length of the longer diagonal of the indenter (in mm).

| Example No. | 1 | 2 | 3 | 4 | 5 | 6 | 7 | 8 | 9 | 10 |
|---|---|---|---|---|---|---|---|---|---|---|
| $P_2O_5$ | 60.0 | 55.7 | 51.4 | 60.0 | 55.7 | 57.6 | 57.6 | 60.0 | 60.0 | 60.5 |
| $B_2O_3$ | 5.0 | 8.3 | 6.6 | 6.0 | 5.0 | 7.5 | 5.0 | 2.5 | 5.0 | 5.0 |
| $SiO_2$ | 5.0 | 1.0 | 2.0 | 0.9 | 4.3 | 2.5 | 5.0 | 7.5 | 5.0 | 5.0 |
| $Li_2O$ | — | 8.3 | 5.0 | 5.0 | 3.3 | 5.0 | 15.0 | 3.3 | 6.3 | 5.0 |
| $Na_2O$ | — | 16.7 | 10.0 | 10.0 | 6.7 | 10.0 | — | 6.7 | 12.7 | 10.0 |
| $K_2O$ | — | — | — | — | — | — | 5.0 | — | — | — |
| MgO | — | — | — | — | — | — | — | — | — | — |
| CaO | 30.0 | 10.0 | 25.0 | 15.0 | 20.0 | 15.0 | 15.0 | 15.0 | 11.0 | 5.0 |

| | | | | | -continued | | | | | |
|---|---|---|---|---|---|---|---|---|---|---|
| SrO | — | — | — | — | — | — | — | — | — | — |
| BaO | — | — | — | — | — | — | — | — | — | 9.5 |
| ZnO | — | — | — | — | 5.0 | — | — | — | — | — |
| PbO | — | — | — | 3.1 | — | 2.4 | 2.4 | — | — | — |
| $Al_2O_3$ | — | — | — | — | — | — | — | — | — | — |
| Dw (%) | 0.30 | 0.45 | 0.44 | 0.39 | 0.28 | 0.34 | 0.29 | 0.30 | 0.28 | 0.27 |
| Hk (kg/mm²) | 418 | 419 | 439 | 390 | 430 | 430 | 440 | 411 | 429 | 424 |

| Example No. | 11 | 12 | 13 | 14 | 15 | 16 | 17 | 18 |
|---|---|---|---|---|---|---|---|---|
| $P_2O_5$ | 58.0 | 58.9 | 56.8 | 58.2 | 59.0 | 56.0 | 55.0 | 61.0 |
| $B_2O_3$ | 5.0 | 5.0 | 1.0 | 5.0 | 5.0 | 4.0 | 5.0 | 5.0 |
| $SiO_2$ | 7.0 | 5.0 | 11.5 | 5.0 | 5.0 | 5.0 | 5.0 | 5.0 |
| $Li_2O$ | 5.0 | 5.0 | 5.2 | 5.0 | — | 3.3 | 3.3 | 5.0 |
| $Na_2O$ | 10.0 | 10.0 | 10.5 | 10.0 | 15.0 | 6.7 | 6.7 | 10.0 |
| $K_2O$ | — | — | — | — | — | — | — | — |
| MgO | 5.0 | 11.1 | — | — | 5.0 | 25.0 | — | — |
| CaO | 5.0 | — | 15.0 | — | 5.0 | — | — | — |
| SrO | — | — | — | 16.8 | — | — | 25.0 | — |
| BaO | 5.0 | 5.0 | — | — | 5.0 | — | — | 14.0 |
| ZnO | — | — | — | — | — | — | — | — |
| PbO | — | — | — | — | — | — | — | — |
| $Al_2O_3$ | — | — | — | — | 1.0 | — | — | — |
| Dw (%) | 0.21 | 0.16 | 0.35 | 0.25 | 0.22 | 0.16 | 0.18 | 0.21 |
| Hk (kg/mm²) | 448 | 456 | 440 | 430 | 425 | 465 | 448 | 410 |

Corresponding Weight Percent Values of Glasses of Above Examples 1-18

| Example No. | $P_2O_5$ | $B_2O_3$ | $SiO_2$ | $Li_2O$ | $Na_2O$ | $K_2O$ | MgO | CaO | SrO | BaO | ZnO | PbO | $Al_2O_3$ |
|---|---|---|---|---|---|---|---|---|---|---|---|---|---|
| 1 | 78.5 | 3.2 | 2.8 | | | | | 15.5 | | | | | |
| 2 | 76.1 | 5.6 | 0.6 | 2.4 | 10.0 | | | 5.4 | | | | | |
| 3 | 72.6 | 4.6 | 1.2 | 1.5 | 6.2 | | | 14.0 | | | | | |
| 4 | 75.4 | 3.7 | 0.5 | 1.3 | 5.5 | | | 7.5 | | | | 6.1 | |
| 5 | 74.9 | 3.3 | 2.4 | 0.9 | 3.9 | | | 10.6 | | | 3.9 | | |
| 6 | 74.4 | 4.7 | 1.4 | 1.4 | 5.6 | | | 7.7 | | | | 4.9 | |
| 7 | 76.8 | 3.3 | 2.8 | 4.2 | | | | 7.9 | | | | 5.0 | |
| 8 | 77.7 | 1.6 | 4.1 | 0.9 | 3.8 | 4.3 | | 7.7 | | | | | |
| 9 | 79.2 | 3.2 | 2.8 | 1.8 | 7.3 | | | 5.7 | | | | | |
| 10 | 73.1 | 3.0 | 2.6 | 1.3 | 5.3 | | | 2.4 | | 12.4 | | | |
| 11 | 74.7 | 3.2 | 3.8 | 1.4 | 5.6 | | 1.8 | 2.5 | | 7.0 | | | |
| 12 | 76.1 | 3.2 | 2.7 | 1.4 | 5.6 | | 4.1 | | | 7.0 | | | |
| 13 | 77.0 | 0.7 | 6.6 | 1.5 | 6.2 | | | 8.0 | | | | | |
| 14 | 72.3 | 3.0 | 2.6 | 1.3 | 5.4 | | | | 15.2 | | | | |
| 15 | 74.1 | 3.1 | 2.7 | | 8.2 | | 1.8 | 2.5 | | 6.8 | | | 0.9 |
| 16 | 79.1 | 2.8 | 3.0 | 1.0 | 4.1 | | 10.0 | | | | | | |
| 17 | 67.5 | 3.0 | 2.6 | 0.9 | 3.6 | | | | 22.4 | | | | |
| 18 | 70.8 | 2.8 | 2.5 | 1.2 | 5.1 | | | 17.6 | | | | | — |

The glasses shown in these Examples did not become blurred when they were allowed to stand indoors for 24 hours in air kept at a temperature of 20° C. and a relative humidity of 70%, and then human breath (about 37° C., 100% RH) was applied to the glass. On the other hand, general silicate glasses were completely blurred when subjected to the same evaluation.

When these glasses were kept for 15 minutes in a refrigerator at 0° C., and then taken out into a room having an air temperature of 20° C. and a relative humidity of 75%, they were not blurred at all, or blurred to a very slight extent as compared with the case of silicate glasses.

When these glasses were allowed to stand at a temperature of 30° C., and a relative humidity of about 100%, they were scarcely attacked to form a tacky layer. Furthermore, with the glass of this invention, a sufficient planar precision can be obtained using an ordinary polishing operation, and the glasses were not easily damaged.

The increase in water resistance and hardness by introduction of $CeO_2$ and $Nd_2O_3$ or $Er_2O_3$ in this invention is shown below in comparison with that of a glass which does not contain these components (all proportions indicated below are in mole %).

$\lambda T_5(m\mu)$ is the wavelength at which the transmittance of a glass sheet having a thickness of 2 mm in the spectral transmittance curve thereof is 5%.

| Component | Example No. | | | | | Comparative Example 1 |
|---|---|---|---|---|---|---|
| | 19 | 20 | 21 | 22 | 23 | |
| $P_2O_5$ | 59.1 | 59.1 | 59.1 | 59.1 | 59.1 | 59.1 |
| $SiO_2$ | 5.0 | 5.0 | 5.0 | 5.0 | 5.0 | 5.0 |
| $B_2O_3$ | 5.0 | 5.0 | 5.0 | 5.0 | 5.0 | 5.0 |
| $Li_2O$ | 5.0 | 5.0 | 5.0 | 5.0 | 5.0 | 5.0 |
| $Na_2O$ | 10.0 | 10.0 | 10.0 | 10.0 | 10.0 | 10.0 |
| CaO | 10.0 | 10.0 | 10.0 | 10.0 | 10.0 | 10.0 |
| BaO | 5.0 | 5.0 | 5.0 | 5.0 | 5.0 | 5.0 |
| PbO | 0.9 | 0.9 | 0.9 | 0.9 | 0.9 | 0.9 |
| $CeO_2$ | 0.17 | 0.33 | 0.65 | 0.33 | 0.33 | — |
| $Nd_2O_3$ | — | — | — | 0.17 | — | — |
| $Er_2O_3$ | — | — | — | — | 0.15 | — |
| nd | 1.524 | 1.525 | 1.526 | 1.526 | 1.527 | 1.523 |
| Dw (%) | 0.24 | 0.22 | 0.20 | 0.19 | 0.19 | 0.27 |

| Component | Example No. | | | | | Comparative Example 1 |
|---|---|---|---|---|---|---|
| | 19 | 20 | 21 | 22 | 23 | |
| Hk (kg/mm$^2$) | 420 | 426 | 430 | 430 | 429 | 413 |
| $\lambda T_5$ (m$\mu$) | 307 | 310 | 314 | 311 | 312 | 248 |

None of the above glasses of this invention are blurred even when the breath is blown against the glasses at 20° C. and a relative humidity of 70%. The glasses of this invention are also not blurred when they are allowed to stand at 0° C. and a relative humidity of 75%.

FIG. 2 shows the special transmittance curves of 2 mm-thick glass sheets obtained in Examples 21, 22 and 23 of this invention, the glass of Comparative Example 1 and, as Comparative Example 2, Example 10 of this invention (i.e., $P_2O_5$ 60.5%, $B_2O_3$ 5%, $SiO_2$ 5%, $Li_2O$ 5%, $Na_2O$ 10%, CaO 5%, BaO 9.5%, in mole %). The glasses of Examples 19–23 absorb ultraviolet light in the wavelength region considered to be injurious to the eyes, and those containing $Nd_2O_3$ or $Er_2O_3$ produce an effect of reducing glare because they selectively absorb light of wavelengths in the range of which the human eye is most sensitive.

Additional examples of the glass of this invention and their characteristics are tabulated below (all proportions are in mole %).

| Component | Example No. | | | | | | |
|---|---|---|---|---|---|---|---|
| | 24 | 25 | 26 | 27 | 28 | 29 | 30 |
| $P_2O_5$ | 60.0 | 55.7 | 51.4 | 55.7 | 57.6 | 60.0 | 59.0 |
| $B_2O_3$ | 5.0 | 8.3 | 6.6 | 5.0 | 5.0 | 2.5 | 5.0 |
| $SiO_2$ | 5.0 | 1.0 | 2.0 | 4.3 | 5.0 | 7.5 | 5.0 |
| $Li_2O$ | — | 8.3 | 5.0 | 3.3 | 15.0 | 3.3 | — |
| $Na_2O$ | — | 16.7 | 10.0 | 6.7 | — | 16.7 | 15.0 |
| $K_2O$ | — | — | — | — | — | 5.0 | — |
| MgO | — | — | — | — | — | — | 5.0 |
| CaO | 30.0 | 10.0 | 25.0 | 20.0 | 15.0 | 15.0 | 5.0 |
| SrO | — | — | — | — | — | — | — |
| BaO | — | — | — | — | — | — | 5.0 |
| ZnO | — | — | — | 5.0 | — | — | — |
| PbO | — | — | — | — | 2.4 | — | — |
| $Al_2O_3$ | — | — | — | — | — | — | 1.0 |
| $CeO_2$ | 0.6 | 0.6 | 0.6 | 0.3 | 0.3 | 2.0 | 0.33 |
| $Nd_2O_3$ | — | 0.7 | — | — | — | — | 0.2 |
| $Er_2O_3$ | — | — | 0.25 | 0.40 | — | — | — |
| nd | 1.528 | 1.514 | 1.529 | 1.527 | 1.525 | 1.515 | 1.523 |
| Dw (%) | 0.22 | 0.30 | 0.27 | 0.19 | 0.24 | 0.17 | 0.16 |
| HK (kg/mm$^2$) | 434 | 446 | 455 | 447 | 447 | 440 | 436 |
| $\lambda T_5$ (m$\mu$) | 312 | 312 | 313 | 310 | 309 | 320 | 311 |

| Component | Example No. | | | | | |
|---|---|---|---|---|---|---|
| | 31 | 32 | 33 | 34 | 35 | 36 |
| $P_2O_5$ | 58.9 | 56.8 | 58.2 | 56.0 | 55.0 | 61.0 |
| $B_2O_3$ | 5.0 | 1.0 | 5.0 | 4.0 | 5.0 | 5.0 |
| $SiO_2$ | 5.0 | 11.5 | 5.0 | 5.0 | 5.0 | 5.0 |
| $Li_2O$ | 5.0 | 5.2 | 5.0 | 3.3 | 3.3 | 5.0 |
| $Na_2O$ | 10.0 | 10.5 | 10.0 | 6.7 | 6.7 | 10.0 |
| $K_2O$ | — | — | — | — | — | — |
| MgO | 11.1 | — | — | 25.0 | — | — |
| CaO | — | 15.0 | — | — | — | — |
| SrO | — | — | 16.8 | — | 25.0 | — |
| BaO | 5.0 | — | — | — | — | 14.0 |
| ZnO | — | — | — | — | — | — |
| PbO | — | — | — | — | — | — |
| $Al_2O_3$ | — | — | — | — | — | — |
| $CeO_2$ | 0.15 | 0.18 | 0.4 | 0.3 | 0.3 | 0.3 |
| $Nd_2O_3$ | — | — | 1.5 | 0.3 | — | — |
| $Er_2O_3$ | — | — | — | — | 0.25 | 0.50 |
| nd | 1.522 | 1.519 | 1.527 | 1.520 | 1.532 | 1.529 |
| Dw (%) | 0.14 | 0.32 | 0.11 | 0.10 | 0.11 | 0.12 |
| Hk (kg/mm$^2$) | 461 | 448 | 450 | 472 | 455 | 423 |
| $\lambda T_5$ (m$\mu$) | 306 | 308 | 312 | 311 | 310 | 310 |

| Example No. | Corresponding Weight Percent Values of Glasses of Above Examples 19–36 and Comparative Example | | | | | | | | | | |
|---|---|---|---|---|---|---|---|---|---|---|---|
| | Component | | | | | | | | | | |
| | $P_2O_5$ | $SiO_2$ | $B_2O_3$ | $Li_2O$ | $Na_2O$ | CaO | BaO | PbO | $CeO_2$ | $Nd_2O_3$ | $Er_2O_3$ |
| 19 | 74.0 | 2.7 | 3.1 | 1.3 | 5.5 | 4.9 | 6.8 | 1.8 | 0.25 | — | — |
| 20 | " | " | " | " | " | " | " | " | 0.5 | — | — |
| 21 | " | " | " | " | " | " | " | " | 1.0 | — | — |
| 22 | " | " | " | " | " | " | " | " | 0.5 | 0.5 | — |
| 23 | " | " | " | " | " | " | " | " | 0.5 | — | 0.5 |
| Comparative Example 1 | " | " | " | " | " | " | " | " | — | — | — |

| Example No. | Component | | | | | | | | | | | | | | |
|---|---|---|---|---|---|---|---|---|---|---|---|---|---|---|---|
| | $P_2O_5$ | $B_2O_3$ | $SiO_2$ | $Li_2O$ | $Na_2O$ | $K_2O$ | MgO | CaO | SrO | BaO | ZnO | PbO | $Al_2O_3$ | $CeO_2$ | $Nd_2O_3$ | $Er_2O_3$ |
| 24 | 78.5 | 3.2 | 2.8 | | | | | 15.5 | | | | | | 1.0 | | |
| 25 | 76.1 | 5.6 | 0.6 | 2.4 | 10.0 | | | 5.4 | | | | | | 1.0 | 2.3 | |
| 26 | 72.6 | 4.6 | 1.2 | 1.5 | 6.2 | | | 14.0 | | | | | | 1.0 | | 1.0 |
| 27 | 74.9 | 3.3 | 2.4 | 0.9 | 3.9 | | | 10.6 | | | 3.9 | | | 0.5 | | 1.4 |
| 28 | 76.8 | 3.3 | 2.8 | 4.2 | | | | 7.9 | | | | 5.0 | | 0.5 | | |
| 29 | 77.7 | 1.6 | 4.1 | 0.9 | 3.8 | 4.3 | | 7.7 | | | | | | 3.1 | | |
| 30 | 74.1 | 3.1 | 2.7 | | 8.2 | | 1.8 | 2.5 | | 6.8 | | | 0.9 | 0.5 | 0.6 | |
| 31 | 76.1 | 3.2 | 2.7 | 1.4 | 5.6 | | 4.1 | | | 7.0 | | | | 0.2 | | |
| 32 | 77.0 | 0.7 | 6.6 | 1.5 | 6.2 | | | 8.0 | | | | | | 0.3 | | |
| 33 | 72.3 | 3.0 | 2.6 | 1.3 | 5.4 | | | | | 15.2 | | | | 0.6 | 4.4 | |
| 34 | 79.1 | 3.0 | 3.0 | 1.0 | 4.1 | | 10.0 | | | | | | | 0.5 | 1.0 | |
| 35 | 67.5 | 3.0 | 2.6 | 0.9 | 3.6 | | | | 22.4 | | | | | 0.4 | | 0.8 |
| 36 | 70.8 | 2.8 | 2.5 | 1.2 | 5.1 | | | | | 17.6 | | | | 0.4 | | 1.6 |

The glasses in these examples, like those in Examples 19–23 given hereinabove, absorb ultraviolet light injurious to the eyes, and have superior water resistance which prevents the generation of a tacky layer on the glass surface as a result of reaction with moisture in the air. They also can be easily polished, are scar resistant and have a hardness suitable for eyeglass lenses. These glasses do not blur at all, or blur only to a very slight degree, under normal temperature and humidity conditions encountered in everyday use.

Thus, the glass of this invention has a refractive index suitable for eyeglasses, and absorbs ultraviolet light injurious to the eyes. The glass of this invention is resistant to blurring, reduces glare, and has a water resistance and a hardness satisfactory for practical purposes. Hence, the glass of this invention is very suitable for use as antiblurring glasses for eyeglasses.

The glass of this invention may be coated on other glasses or plastics, etc., by sputtering or fusion to render the surface of these materials resistant to blurring.

Raw materials for $P_2O_5$ may be compounds with other oxides such as $Ca(PO_3)_2$, but $H_3PO_4$ is most suitable. $H_3BO_3$ and $Na_2b_4O_7$ can be used as raw materials for $B_2O_3$. Usually, the corresponding carbonates are used as raw materials for the alkali metal oxides and alkaline earth metal oxides, but the nitrates thereof can also be used. For $SiO_2$, $ZnO$, $PbO$, $CeO_2$, $Nd_2O_3$ and $Er_2O_3$ the oxides are used as materials. $Al(OH)_3$ can be used for the $Al_2O_3$.

Since the glass of this invention does not corrode platinum, the raw materials can be melted in a platinum crucible.

The glass of Example No. 10 of this invention was produced in the following manner.

5.93 liters of $H_3PO_4$, 474 g of $H_3BO_4$, 232 g of $SiO_2$, 286 g of $Li_2CO_3$, 813 g of $Na_2CO_3$, 384 g of $CaCO_3$, and 1429 g of $BaCO_3$ were well mixed, and after the reaction stopped, the mixture was directly poured into a platinum crucible in an electric furnace. After the pouring, the mixture was subjected to a clarifying step and a finishing step, and then cast in a mold and annealed. The time from the start of pouring to the casting was about 8 hours.

The refractive index of the glass obtained was adjusted for use as an eyeglass lens. The properties of this glass were compared with those of the glass for an eyeglass lens obtained in Example No. 16 of Japanese Patent Application(OPI) No. 46713/75. The results are shown below.

| Properties | Example No. 10 of this Invention | Example No. 16 of Japanese Patent Application (OPI) No. 46713/75 |
|---|---|---|
| Refractive Index (nd) | 1.52350 | 1.52431 |
| Dispersion (νd) | 67.72 | 61.76 |
| Specific Gravity (g/cm$^3$) | 2.68 | 2.65 |
| Transition Temperature (°C.) | 321 | 262 |
| Yield Temperature (°C.) | 353 | 289 |
| Coefficient of Thermal Expansion ($\times 10^{-7}$/°C.) | 136 | 164 |
| Knoop Hardness (kg/mm$^2$) | 424 | 342 |
| Water Resistance (% weight loss) (*1) | 0.27 | 0.80 |
| Water Resistance (% weight loss) (*2) | 1.7 | 8.2 |

(*1) Values obtained using the measuring method described hereinabove.
(*2) Values obtained using the measuring method (powder method) stipulated by the Standards of the Japan Association of Optical Glass Industry.

The glass of Example No. 10 of the invention had a transition temperature of more than 300° C., and the Knoop hardness of this glass is comparable to that of flint glass used as an optical glass. The hardness of the glass of Example No. 16 of Japanese Patent Application (OPI) No. 46713/75 is extremely low. Furthermore, the glass of Example No. 10 of this invention has a water resistance which is several times the water resistance of the glass of Example No. 16 of the Japanese Patent Application (OPI) No. 46713/75.

In order to test the antiblurring property, these glasses were each allowed to stand in an atmosphere kept at a temperature of 12° C. and a relative humidity of 22%, an atmosphere kept at a temperature of 3° C. and a relative humidity of 40%, and an atmosphere kept at a temperature of 6° C. and a relative humidity of 55%, respectively, and then human breath was blown against them. The glass of Example No. 16 of the Japanese Patent Application (OPI) No. 46713/75 was blurred, but the glass of Example No. 10 of this invention was scarcely blurred. Of course, the glass of this invention did not become blurred at a relative humidity of more than 55%.

Thus, the glass of Example No. 16 of the Japanese Patent Application (OPI) No. 46713/75 loses its wetting ability and becomes blurred at a relative humidity of less than 60%, whereas the glass of the invention shows a wetting ability over a relatively broad temperature range, and is resistant to blurring. Furthermore, upon water absorption at a high relative humidity, the glass of Example No. 16 of the Japanese Patent Application (OPI) No. 46713/75 does not permit spreading of water droplets to a great extent, and the image on this glass is indistinct. On the other hand, the glass of this invention immediately permits a spreading of water droplets to wet the glass surface, and therefore, the image is relatively clear.

Figure 1:
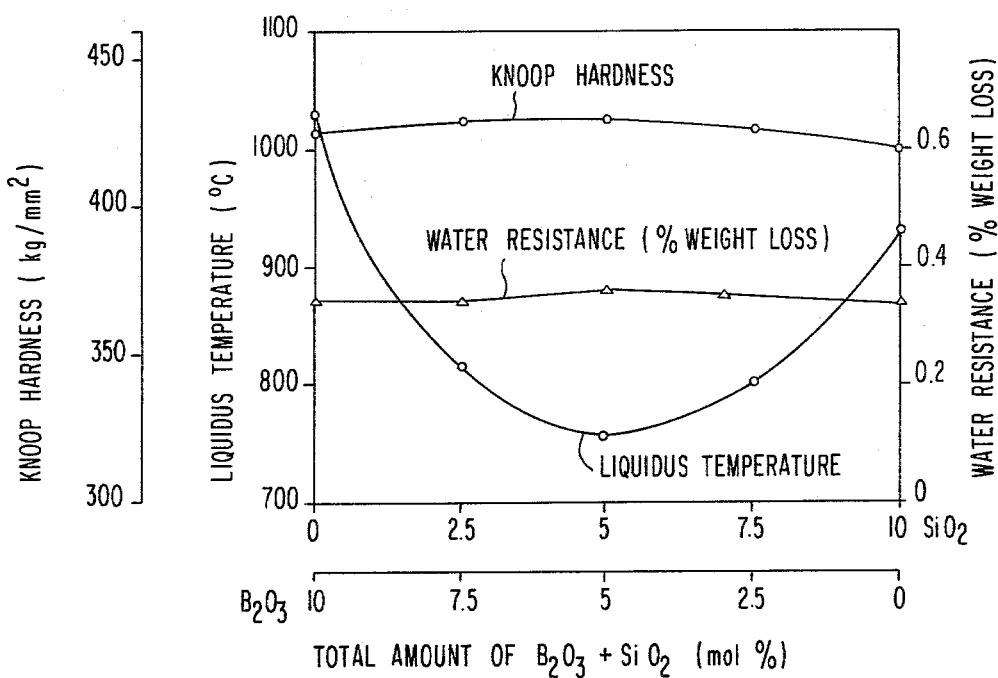
FIG. 1 shows a graphical presentation of the effect of the copresence of $SiO_2$ and $B_2O_3$ on the liquidus temperature of the glass of Example 6, given hereinafter, and the water resistance and Knoop hardness of the glass.

FIG. 1 is a graphic representation showing the effect of the copresence of $SiO_2$ and $B_2O_3$ at the liquidus temperature of the glass of Example No. 6 of the invention together with its water resistance and Knoop hardness. The graph demonstrates that the presence of $SiO_2$ and $B_2O_3$ maintains good water resistance and hardness, and meanwhile, drastically decreases the liquids temperature, whereby the glass is resistant to devitrification. The liquidus temperature of the glass was measured while maintaining the glass particles for 30 minutes in a temperature-gradient furnace.

Since the glass of this invention having an antiblurring property has relatively good water resistance and hardness, it can be used not only as an eyeglass lens, but also as other optical materials such as lenses and prisms, windowpanes and mirrors. It is also possible to render these optical articles antiblurring by forming the surfaces of such articles with the glass of this invention using a method such as sputtering.

While the invention has been described in detail and with reference to specific embodiments thereof, it will be apparent to one skilled in the art that various changes and modifications can be made therein without departing from the spirit and scope thereof.

What is claimed is:

1. A glass for use as an optical glass having an antiblurring property, water resistance and hardness and decreased liquidus temperature, said glass consisting essentially of the following ingredients in mol %.

| | |
|---|---|
| $P_2O_5$ | 51.4 to 61.0 |
| $B_2O_3$ | 1.0 to 8.3 |
| $SiO_2$ | 1.0 to 11.5 |
| $SiO_2 + B_2O_3$ | 6.0 to 15.0 |
| MgO | 0 to 25.0 |
| CaO | 0 to 30.0 |
| SrO | 0 to 25.0 |
| $Li_2O$ | 0 to 15.0 |

| -continued | |
|---|---|
| $Na_2O$ | 0 to 16.7 |
| $K_2O$ | 0 to 5.0 |
| BaO | 0 to 14.0 |
| ZnO | 0 to 5.0 |
| $Al_2O_3$ | 0 to 1.0 |
| $Li_2O + Na_2O + K_2O$ | 0 to 30.0 |
| $MgO + CaO + SrO + BaO$ | 5.0 to 35.0 |
| $MgO + CaO + SrO + BaO + Li_2O + Na_2O + K_2O$ | 20.0 to 45.0 | and having a water resistance of 0.16 to 0.45% and a knoop hardness of 410 to 465 Kg/mm² and no PbO.

2. A glass for use as an optical glass having an anti-blurring property, water resistance and hardness and decreased liquidus temperature, said glass consisting essentially of the following ingredients in mol %:

| | |
|---|---|
| $P_2O_5$ | 51.4 to 61.0 |
| $SiO_2$ | 1.0 to 11.5 |
| $B_2O_3$ | 1.0 to 8.3 |
| $SiO_2 + B_2O_3$ | 6.0 to 15.0 |

| -continued | |
|---|---|
| $Li_2O$ | 3.3 to 8.3 |
| SrO | 0 to 25.0 |
| BaO | 0 to 14.0 |
| ZnO | 0 to 5.0 |
| $Na_2O$ | 0 to 16.7 |
| $K_2O$ | 0 to 5.0 |
| MgO | 0 to 25.0 |
| CaO | 0 to 30.0 |
| $Al_2O_3$ | 0 to 1.0 |
| $Li_2O + Na_2O + K_2O$ | 3.3 to 30.0 |
| $MgO + CaO + SrO + BaO$ | 5.0 to 35.0 |
| $MgO + CaO + SrO + BaO + Li_2O + Na_2O + K_2O$ | 20.0 to 45.0 |
| and per 100 parts by mole of the above there is present in parts by mole: | |
| $CeO_2$ | 0.15 to 0.6 and |
| $Nd_2O_3$ | 0 to 1.5 or |
| $Er_2O_3$ | 0 to 0.5 | and having a water resistance of 0.10 to 0.32%, a knoop hardness of 423 to 472 Kg/mm², a $\lambda T_5$ of 306 to 320 mm and a refractive index (nd) of 1.514 to 1.532 and no PbO.

3. The glass of claim 2, wherein the proportion of $Nd_2O_3$ is 0.2 to 1.5 parts by mole and the proportion of $Er_2O_3$ is 0.25 to 0.5 part by mole.

* * * * *